US012561663B2

(12) United States Patent
Clark

(10) Patent No.: US 12,561,663 B2
(45) Date of Patent: *Feb. 24, 2026

(54) DEVICE ACCOUNT ACTIVATION

(71) Applicant: American Express Travel Related Services Company, Inc., New York, NY (US)

(72) Inventor: Alan Clark, Brighton (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,663

(22) Filed: Sep. 30, 2024

(65) Prior Publication Data

US 2025/0021961 A1     Jan. 16, 2025

Related U.S. Application Data

(63) Continuation of application No. 18/180,679, filed on Mar. 8, 2023, now Pat. No. 12,131,308, which is a
(Continued)

(51) Int. Cl.
*G06Q 20/32* (2012.01)
*G06Q 20/38* (2012.01)
(Continued)

(52) U.S. Cl.
CPC ..... *G06Q 20/3227* (2013.01); *G06Q 20/3821* (2013.01); *G06Q 20/401* (2013.01); *G06Q 20/4016* (2013.01); *G06F 21/44* (2013.01)

(58) Field of Classification Search
None
See application file for complete search history.

(56) References Cited

U.S. PATENT DOCUMENTS 7,207,060 B2     4/2007 Immonen et al.
7,311,249 B2     12/2007 Smith et al.
(Continued)

FOREIGN PATENT DOCUMENTS

AU     2010271244 B2     12/2014
CA     2726787 A1     12/2009
(Continued)

OTHER PUBLICATIONS

X. Li, W. Zhu and M. He, "Secure remote mobile payment architecture and application," 2010 International Symposium on Computer, Communication, Control and Automation (3CA), Tainan, Taiwan, 2010, pp. 487-490, https://ieeexplore.ieee.org/document/5533752?source=IQplus (Year: 2010).*
(Continued)

*Primary Examiner* — El Mehdi Oussir
(74) *Attorney, Agent, or Firm* — Thomas Horstemeyer, LLP

(57) ABSTRACT
In various embodiments, a system, method, and computer readable medium of the present disclosure comprises obtaining credential information of a user of the computing device; authenticating the credential information of the user; releasing, in response to authenticating the credential information, a first secret element to a secure element processor of the computing device, wherein the first secret element is associated with a first transaction account; comparing the first secret element with an issuer element associated with the first transaction account; verifying that the user is an authorized user based on the comparison of the first secret element with the issuer element; initiating a payment transaction using first transaction account information with a point of sale terminal; and/or sending an indication that the user has been confirmed as an authorized user to the point of sale
(Continued)

100

| CREATE A COMPARISON PROTOCOL FOR AN ISSUER ELEMENT AND A SECRET ELEMENT TO DETERMINE WHETHER THE SECRET ELEMENT SATISFIES THE ISSUER ELEMENT | 110 |

ASSOCIATE ISSUER ELEMENT WITH THE TRANSACTION ACCOUNT — 115

RECEIVE, IN THE SECURE ELEMENT, THE SECRET ELEMENT — 125

COMPARE, BY THE SECURE ELEMENT, THE SECRET ELEMENT TO THE ISSUER ELEMENT BASED ON THE COMPARISON PROTOCOL — 130

ENABLE, BY THE SECURE ELEMENT, THE TRANSACTION ACCOUNT FOR PURCHASES WITH THE MOBILE DEVICE — 135 terminal to enable authorization of the payment transaction initiated by the computing device.

20 Claims, 3 Drawing Sheets

Related U.S. Application Data continuation of application No. 16/211,420, filed on Dec. 6, 2018, now Pat. No. 11,631,074, which is a continuation of application No. 14/639,666, filed on Mar. 5, 2015, now Pat. No. 10,185,949.

(51) Int. Cl.
*G06Q 20/40* (2012.01)
*G06F 21/44* (2013.01)

(56) References Cited

U.S. PATENT DOCUMENTS

| | | | |
|---|---|---|---|
| 7,788,151 B2 | 8/2010 | Pizzi et al. | |
| 8,538,863 B1 | 9/2013 | Saunders | |
| 8,905,303 B1 | 12/2014 | Ben | |
| 8,914,876 B2 | 12/2014 | Taveau et al. | |
| 8,923,827 B2 | 12/2014 | Wentker et al. | |
| 8,996,423 B2 | 3/2015 | Johnson et al. | |
| 9,009,805 B1 | 4/2015 | Kirkby et al. | |
| 9,047,601 B2 | 6/2015 | Xie et al. | |
| 9,374,370 B1 | 6/2016 | Bent, II et al. | |
| 9,571,559 B2 | 2/2017 | Raleigh et al. | |
| 9,785,935 B2 | 10/2017 | Itwaru | |
| 9,858,556 B2 | 1/2018 | Miller et al. | |
| 10,043,186 B2 | 8/2018 | Hammad et al. | |
| 10,362,010 B2 | 7/2019 | Sharp et al. | |
| 10,380,583 B1 | 8/2019 | Ellis et al. | |
| 10,528,944 B2 | 1/2020 | Khan | |
| 10,706,380 B2* | 7/2020 | Sheets | G06Q 10/08 |
| 10,748,153 B2 | 8/2020 | Van Os et al. | |
| 10,878,422 B2 | 12/2020 | Sheets | |
| 10,959,093 B2 | 3/2021 | Powell et al. | |
| 11,080,700 B2* | 8/2021 | Ortiz | G06Q 20/023 |
| 11,514,451 B2 | 11/2022 | Wolfs et al. | |
| 11,748,736 B1 | 9/2023 | Kurani et al. | |
| 2003/0076957 A1 | 4/2003 | Asokan et al. | |
| 2003/0101136 A1 | 5/2003 | Wheeler et al. | |
| 2003/0200216 A1 | 10/2003 | Hayes et al. | |
| 2007/0119923 A1 | 5/2007 | Garrison et al. | |
| 2007/0245158 A1 | 10/2007 | Giobbi et al. | |
| 2007/0250920 A1 | 10/2007 | Lindsay | |
| 2008/0003977 A1 | 1/2008 | Chakiris et al. | |
| 2008/0114830 A1 | 5/2008 | Welingkar et al. | |
| 2008/0319889 A1 | 12/2008 | Hammad | |
| 2009/0106148 A1 | 4/2009 | Prada | |
| 2009/0140839 A1 | 6/2009 | Bishop et al. | |
| 2009/0187980 A1 | 7/2009 | Tung | |
| 2010/0077468 A1 | 3/2010 | Pragides et al. | |
| 2010/0106649 A1 | 4/2010 | Annan | |
| 2010/0274692 A1 | 10/2010 | Hammad | |
| 2011/0113237 A1 | 5/2011 | Hird et al. | |
| 2011/0113245 A1 | 5/2011 | Varadarajan | |
| 2012/0028609 A1 | 2/2012 | Hruska | |
| 2012/0031969 A1* | 2/2012 | Hammad | G06Q 20/341 |
| | | | 235/380 |
| 2012/0116967 A1 | 5/2012 | Klein et al. | |
| 2012/0143706 A1 | 6/2012 | Crake et al. | |
| 2012/0317028 A1 | 12/2012 | Ansari | |
| 2013/0018785 A1 | 1/2013 | Dolphin et al. | |
| 2013/0018791 A1 | 1/2013 | Mendicino et al. | |
| 2013/0036000 A1 | 2/2013 | Giordano et al. | |
| 2013/0060618 A1 | 3/2013 | Barton et al. | |
| 2013/0124412 A1 | 5/2013 | Itwaru | |
| 2014/0070001 A1 | 3/2014 | Sanchez et al. | |
| 2014/0108263 A1* | 4/2014 | Ortiz | G06Q 20/3829 |
| | | | 705/44 |

| | | | |
|---|---|---|---|
| 2014/0149294 A1 | 5/2014 | Leevendig et al. | |
| 2014/0189880 A1 | 7/2014 | Funk | |
| 2014/0250006 A1 | 9/2014 | Makhotin et al. | |
| 2014/0279477 A1 | 9/2014 | Sheets et al. | |
| 2014/0310171 A1 | 10/2014 | Grossman et al. | |
| 2014/0325606 A1 | 10/2014 | Raj et al. | |
| 2014/0337236 A1 | 11/2014 | Wong et al. | |
| 2014/0344153 A1 | 11/2014 | Raj et al. | |
| 2014/0351146 A1 | 11/2014 | Johnson et al. | |
| 2015/0019443 A1 | 1/2015 | Sheets et al. | |
| 2015/0032625 A1* | 1/2015 | Dill | G06Q 20/40 |
| | | | 705/44 |
| 2015/0032627 A1 | 1/2015 | Dill et al. | |
| 2015/0046339 A1 | 2/2015 | Wong et al. | |
| 2015/0081554 A1 | 3/2015 | Wong et al. | |
| 2015/0127547 A1 | 5/2015 | Powell et al. | |
| 2015/0134507 A1 | 5/2015 | Lucas et al. | |
| 2016/0019536 A1* | 1/2016 | Ortiz | G06Q 20/36 |
| | | | 705/67 |
| 2016/0036790 A1* | 2/2016 | Shastry | G06Q 20/32 |
| | | | 713/168 |
| 2016/0065370 A1* | 3/2016 | Le Saint | H04L 9/321 |
| | | | 713/155 |
| 2016/0086187 A1 | 3/2016 | Joao | |
| 2016/0092878 A1* | 3/2016 | Radu | G06Q 20/4012 |
| | | | 705/72 |
| 2016/0104154 A1 | 4/2016 | Milov et al. | |
| 2016/0232509 A1 | 8/2016 | Brudnicki et al. | |
| 2016/0247141 A1* | 8/2016 | Graylin | G06Q 20/3674 |
| 2016/0253651 A1* | 9/2016 | Park | G06Q 20/34 |
| | | | 705/39 |
| 2016/0277930 A1 | 9/2016 | Li et al. | |
| 2017/0017957 A1 | 1/2017 | Radu | |
| 2017/0201850 A1 | 7/2017 | Raleigh et al. | |
| 2017/0213207 A1 | 7/2017 | Suberville | |
| 2017/0278097 A1 | 9/2017 | Haggerty et al. | |
| 2017/0323300 A1 | 11/2017 | Weiss | |
| 2018/0006821 A1* | 1/2018 | Kinagi | H04W 12/61 |
| 2019/0303915 A1* | 10/2019 | Hammad | G06Q 20/40 |
| 2019/0311430 A1 | 10/2019 | Raleigh | |
| 2021/0073787 A1 | 3/2021 | Hammad | |
| 2021/0272079 A1 | 9/2021 | Specogna et al. | |
| 2022/0020016 A1* | 1/2022 | Scott | G06Q 20/40 |

FOREIGN PATENT DOCUMENTS

| | | |
|---|---|---|
| CA | 2932346 C | 9/2018 |
| CH | 707488 B1 | 6/2020 |
| CN | 1449540 A | 10/2003 |
| CN | 1561508 A | 1/2005 |
| CN | 100409206 C | 8/2008 |
| CN | 103942690 A | 7/2014 |
| CN | 103984976 A | 8/2014 |
| CN | 104380326 A | 2/2015 |
| CN | 104933564 A | 9/2015 |
| CN | 105359179 A | 2/2016 |
| CN | 106031207 A | 10/2016 |
| CN | 106104619 A | 11/2016 |
| CN | 106506151 A | 3/2017 |
| CN | 109118193 A | 1/2019 |
| CN | 104660586 B | 3/2020 |
| EP | 2836971 A4 | 11/2015 |
| EP | 3040922 A1 | 7/2016 |
| EP | 2836971 B1 | 12/2017 |
| FR | 2496294 A1 | 6/1982 |
| GB | 2514419 A | 11/2014 |
| JP | 2012508928 A | 4/2012 |
| JP | 6322143 B2 | 5/2018 |
| KR | 20090116813 A | 4/2001 |
| KR | 20090087924 A | 7/2006 |
| KR | 20160132379 A | 1/2015 |
| RU | 2663476 C2 | 8/2018 |
| RU | 2669081 C2 | 10/2018 |
| WO | 0201462 A2 | 1/2002 |
| WO | 2011006138 A1 | 1/2011 |
| WO | 2011084990 A1 | 7/2011 |
| WO | 2012035306 A1 | 3/2012 |
| WO | 2013155536 A1 | 10/2013 |

(56) References Cited

FOREIGN PATENT DOCUMENTS

| | | | |
|---|---|---|---|
| WO | 2014044751 | A1 | 3/2014 |
| WO | 2014117095 | A1 | 7/2014 |
| WO | 2014127322 | A1 | 8/2014 |
| WO | 2014149498 | A2 | 9/2014 |

OTHER PUBLICATIONS

S. Abughazalah, K. Markantonakis and K. Mayes, "Secure Mobile Payment on NFC-Enabled Mobile Phones Formally Analysed Using CasperFDR," 2014 IEEE 13th International Conference on Trust, Security and Privacy in Computing and Communications, https://ieeexplore.ieee.org/document/7011278?source=IQplus (Year: 2014).*

Secure & Privacy-Preserving eID Systems with Attribute-Based Credentials http://essay.utwente.nl/66593/1/BadarinathHampiholi_Masters_EEMCS_faculty.pdf (Year: 2014).

P. Urien, "EMV-TLS, A Secure Payment Protocol for NFC Enabled Mobiles," 2014 International Conference on Collaboration Technologies and Systems (CTS), 2014, pp. 203-210, doi: 10.1109/CTS.2014.6867565. https://ieeexplore.ieee.org/stamp/stamp.jps?tp=&arnumber=6867565 (Year: 2014).

Jian Mao, Ku Li and Xiandong Xu, "Trusted Module Based Secure Electronic Transaction Scheme" 2010 IEEE International Conference on Information Theory and Information Security, 2010, pp. 612-615, doi: 10.1109/ICITIS.2010.5689513. https://ieeexplore.ieee.org/document/5689513?source=IQplus (Year: 2010).

Isaac, Jesús Téllez, and Zeadally Sherali. "Secure mobile payment systems." It professional 16.3 (2014): 36-43.

Tiwari, Ayu, et al. "A multi-factor security protocol for wireless payment-secure web authentication using mobile devices." arXiv preprint arXiv:1111.3010 (2011).

Marforio, Claudio, et al. "Smartphones as Practical and Secure Location Verification Tokens for Payments." NDSS. vol. 14. 2014.

* cited by examiner

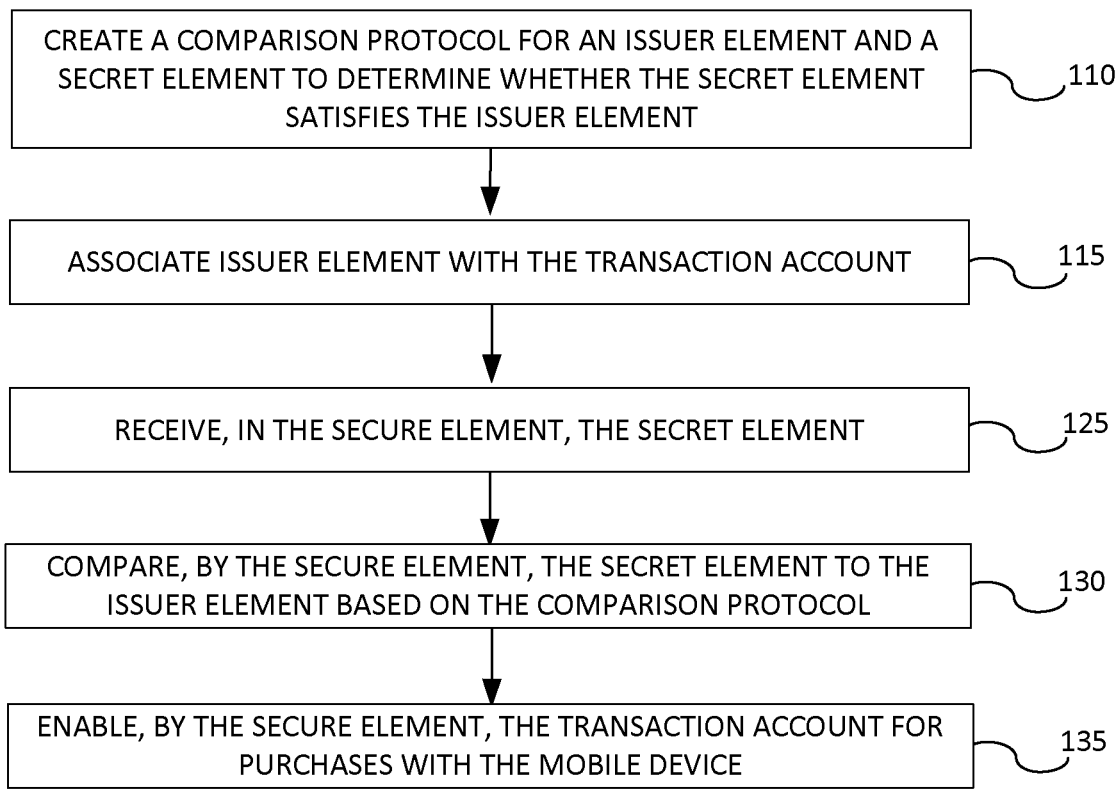

100

CREATE A COMPARISON PROTOCOL FOR AN ISSUER ELEMENT AND A SECRET ELEMENT TO DETERMINE WHETHER THE SECRET ELEMENT SATISFIES THE ISSUER ELEMENT　　110

ASSOCIATE ISSUER ELEMENT WITH THE TRANSACTION ACCOUNT　　115

RECEIVE, IN THE SECURE ELEMENT, THE SECRET ELEMENT　　125

COMPARE, BY THE SECURE ELEMENT, THE SECRET ELEMENT TO THE ISSUER ELEMENT BASED ON THE COMPARISON PROTOCOL　　130

ENABLE, BY THE SECURE ELEMENT, THE TRANSACTION ACCOUNT FOR PURCHASES WITH THE MOBILE DEVICE　　135

MOBILE DEVICE

POS    205

ISSUER SYSTEM    207

DEVICE ACCOUNT ACTIVATION

CROSS-REFERENCE TO RELATED APPLICATION

This application is a continuation of, claims priority to and the benefit of, U.S. Ser. No. 18/180,679, filed on Mar. 8, 2023 and entitled "DEVICE ACCOUNT ACTIVATION," which is a continuation of U.S. Ser. No. 16/211,420, filed on Dec. 6, 2018 (issuing as U.S. Pat. No. 11,631,074), and entitled "DEVICE ACCOUNT ACTIVATION," which is a continuation of U.S. Ser. No. 14/639,666, filed on Mar. 5, 2015 (issuing as U.S. Pat. No. 10,185,949), entitled "SYSTEM AND METHOD FOR AUTHENTICATION OF A MOBILE DEVICE CONFIGURED WITH PAYMENT CAPABILITIES," each of which is incorporated herein by reference in its entirety for all purposes.

TECHNICAL FIELD

The present disclosure relates to systems and methods for authenticating transaction accounts and, more specifically, to systems and methods for authenticating transaction account users and transaction accounts that are enabled on mobile devices configured with payment capabilities.

BACKGROUND

Mobile payment technologies are becoming more prevalent. Known cardholder verification methods typically make use of a credential that is native to the mobile device. This credential may be associated with a transaction account and may be used in place of a typical validation credential (e.g., a pin, a signature, and/or the like) for the transaction account. However, as mobile payment technologies continue to grow and become more prolific in the marketplace, more robust validation methods may be needed to ensure that a mobile device used to initiate a payment is properly authorized to initiate the payment, a receipt, and other such enriched transaction data, as a written or electronic acknowledgment that a specified payment was received from multiple parties (e.g., from the merchant, a third party aggregator, a transaction account processing company, etc.) and manually sends the receipt, or other such enriched transaction data, or manually matches the enriched transaction data with each corresponding posted transaction from the transaction account statement.

SUMMARY

A system for authenticating a transaction account user via a mobile device configured to initiate payments is provided. The system may be configured to perform operations and/or steps comprising receiving, by the processor and in the secure element, a secret element. The secret element may be transmuted to the processor (e.g., the issuer system) via a payment terminal. The secret element may be associated with a user transaction account. The secret element may be stored on the mobile device outside the secure element. The secret element may be provided to the secure element in response to credential information be provided by a user via the mobile device. The device validation element may be a bio-metric input, a pin, and/or the like. The system may further comprise comparing, by the processor and in the secure element, the secret element to an issuer element. The issuer element may be a data module that corresponds to be is not equal to the secret element. The issuer element may be stored on the mobile device in the secure element. The system may also comprise enabling, by the processor, the transaction account to be used for transactions on the mobile device in response to the comparing being a satisfactory comparison.

In various embodiments, a fraud risk for the transaction may be based at least in part on the secret element being compared with the issuer element. The transaction may be authorized by the issuer system in response to the evaluating the fraud risk.

In various embodiments, the secret element may be defined by a transaction account issuer and may be associated with a secure element of the mobile device. During initial account setup, the transaction account and mobile account may be associated with the secret element. The system may also comprise transmitting, by the processor and to the issuer system, an indication that the transaction account is associated with the mobile device.

In various embodiments, the system may comprise creating, by the processor and for the secure element, a comparison protocol for the issuer element and the secret element to determine whether the secret element satisfies to the issuer element. The system may comprise associating, by the processor, the issuer element with the transaction account.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 1 illustrates a process flow for authenticating mobile devices configured to initiate transactions in accordance with various embodiments;

DETAILED DESCRIPTION

Figure 2A:
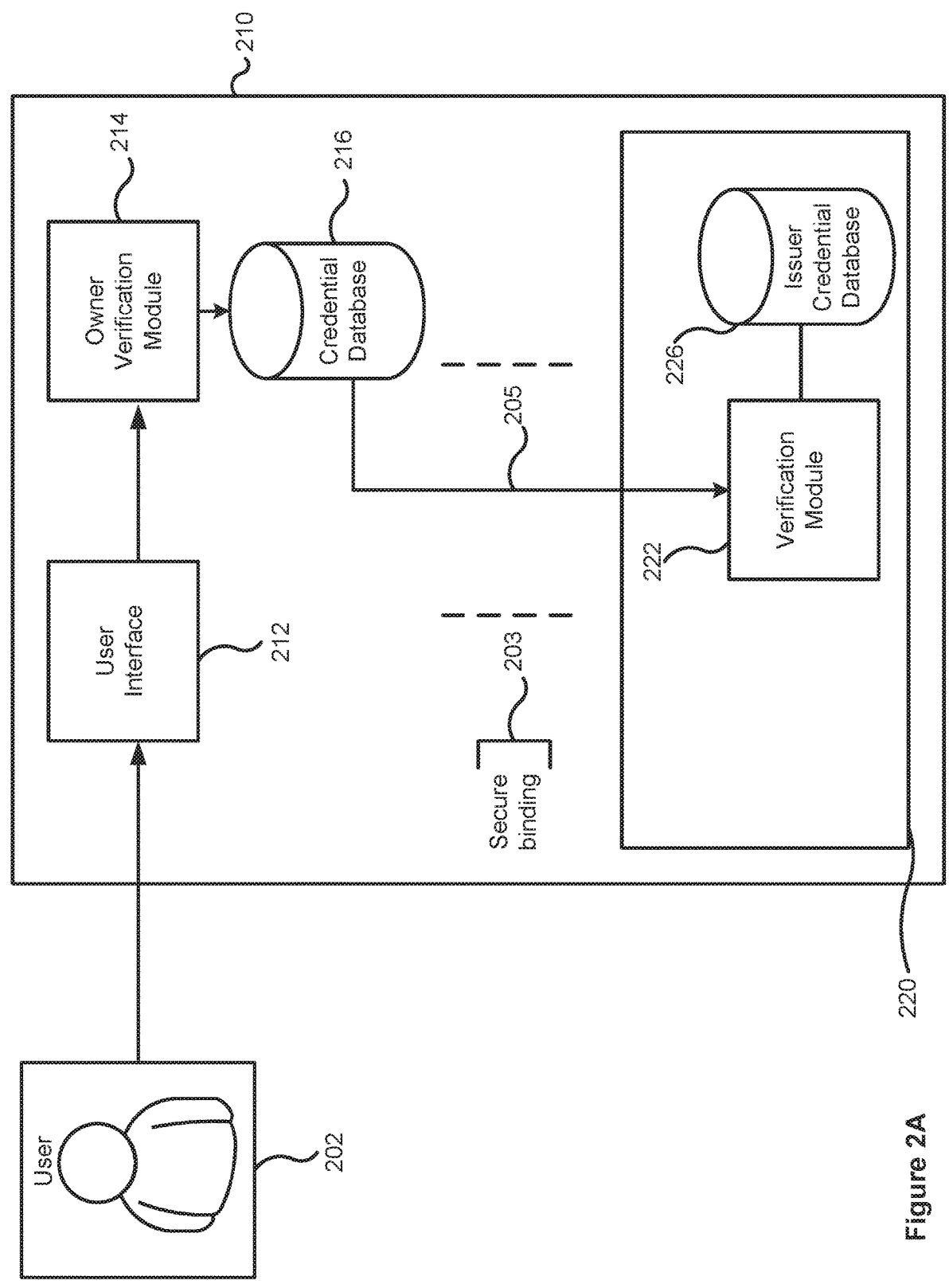
FIG. 2A illustrates an exemplary mobile device architecture for a system configured to authenticate mobile devices configured to initiate transactions, in accordance with various embodiments.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, payments via mobile devices are becoming increasingly common. This trend will likely continue as infrastructure for such payments becomes more widely available in traditional retail locations (e.g., brick and mortar retail locations). As a result, transaction account user verification methods via mobile devices are needed to ensure that payments via mobile devices are being initiated by legitimate device owners. In various embodiments and with reference to FIG. 1 and FIG. 2, a method 100 for authenticating a transaction account user via a mobile device and a corresponding system 200 for executing the method are provided. System 200, as shown in FIG. 2, may comprise a mobile device 210 and a secure element 220. Mobile device 210 may comprise a user interface 212, an owner verification module 214, a credential database 216, and/or the like. Mobile device 210 may also comprise a secure element 220. Secure element 220 may be configured to validate the identity of a user based on mobile device 210 being configured to initiate a payment.

In various embodiments, user interface 212 may be in electronic communication with and operatively coupled to owner verification module 214 and/or credential database 216. Similarly, owner verification module 214 may be operatively coupled to and in electronic communication with credential database 216. Credential database 216 may be configured to store credential information and/or data. This credential information may be of any suitable form including, for example, a code, a bio-metric information, a pattern, and/or the like. The credential information may be defined and/or created by a user. The credential information may be created locally on mobile device 210 via user interface 212. The credential information may be provided by the user via user interface 210 to mobile device 210 to gain access to mobile device 210.

In various embodiments, user interface 212 may be operable and/or configured to receive an input from user 202 (e.g., credential information). User interface 212 may be any suitable user interface including, for example, biometric input, a keypad input, and/or the like. In this regard, user interface 212 may be configured to receive an input from user 202 to authenticate and/or verify that user 202 is an owner and/or authorized user of mobile device 210 (e.g., the user provided satisfactory credential information via user interface 212). This input provided by user interface 212 may be analyzed by owner verification module 214. In this regard, the user input may be compared to and/or evaluated against mobile device verification information (e.g., information indicative of a passcode, pattern, biometric input and/or the like).

Figure 2B:
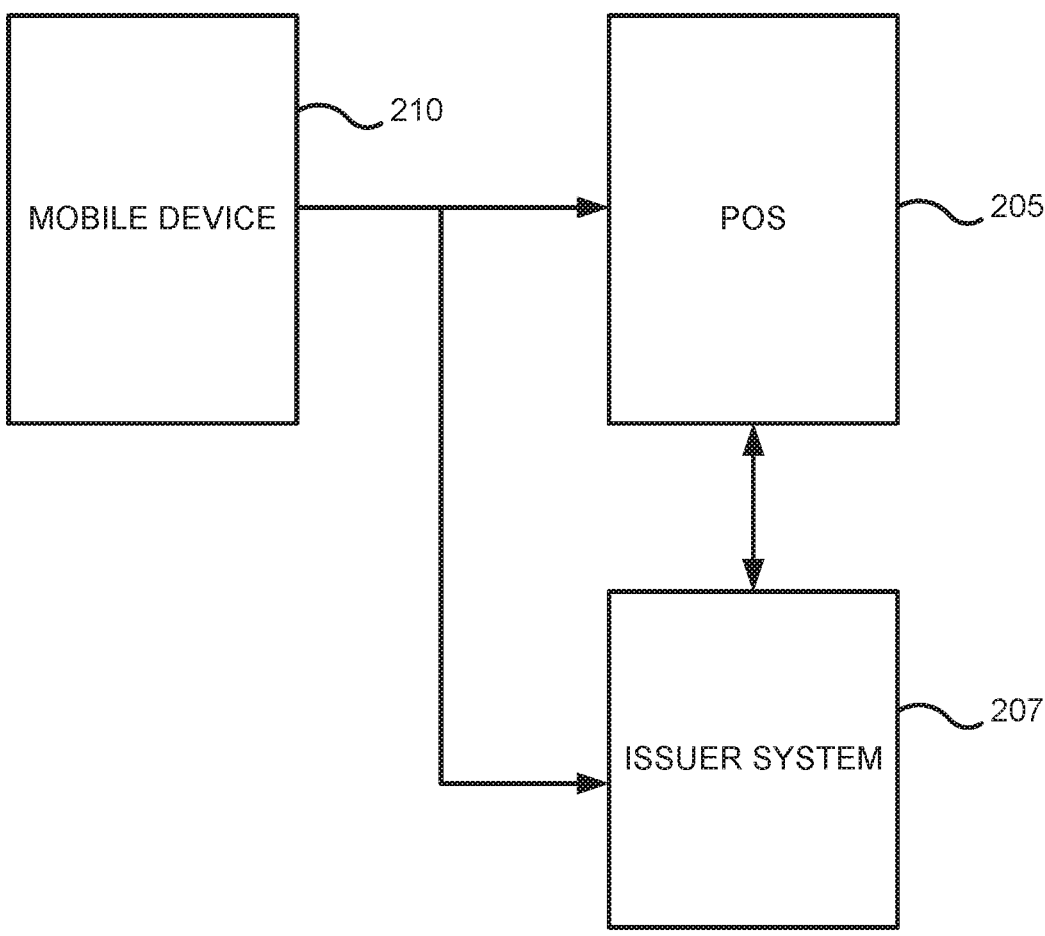
FIG. 2B illustrates exemplary system architecture for a system configured to authenticate mobile devices configured to initiate transactions, in accordance with various embodiments.

In various embodiments and with reference to FIGS. 2A and 2B, mobile device 210 may comprise and be configured to provide data to secure element 220. Secure element 220 may be secure chip that is configured to process identity and/or transaction information. In this regard, commutations between mobile device 210 and secure element 220 may be secure communications 205 by way of a secured binding 203 and/or an encrypted communication method.

In various embodiments, secure element 220 may comprise a verification module 222, an issuer credential database 226, and/or the like. Moreover, secure element 220 may be configured to house sensitive data and/or process confidential, proprietary, financial transaction, and/or other sensitive data (e.g., user validation data).

In various embodiments, secure element 220 and/or verification module 222 may be configured to receive a secret element via secure communication 205 from owner verification module 214. The secret element may be transmitted in response to successfully validation of user credentials by user 202 on mobile device 210. The secret element may be any information defined by the user or the transaction account issuer (e.g., a pin) that verifies that the user is an authorized user of the transaction account. In this regard, the secret element is transmitted to secure element 220 in response to a user providing proper credential information to mobile device 210 via user interface 212.

In various embodiments, the secret element may be stored on the mobile device and may be provided to secure element 220 to provide an increased level of security. Instead of providing a simple indication that credential information has been correctly provided to mobile device 210, mobile device 210 may provide the secret element to secure element 220 so that secure element 220 can verify that the secret element matches the issuer element. This validation scheme provides increased security over the traditional scheme of simply indicating that credential information was properly entered to access mobile device 210. In this regard, the simple indication of the successful entry of credential information would be easier to replicate or fake during a security attack that the secret element.

Verification module 222 may be configured to evaluate, analyze, compare, and/or assess the secret element against an issuer element. The issuer element may be stored in issuer credential database 226 and may be accessed by verification module 222. Verification module 222 may comprise a protocol, algorithm, and/or evaluation method to compare the secret element to the issuer element.

In various embodiments and With continued reference to FIG. 1, FIG. 2A, and FIG. 2B, a method 100 for authorizing and/or verifying a payment initiated with a mobile device at a point of sale may make use of a secret element and an issuer element in response to receiving an indication to use a transaction account via a mobile device. The secret element may be created by a transaction account issuer. The secret element may be stored on the mobile device 210 in secure element 220. During an initial account setup, the secret element may be associated with the transaction account to link and/or otherwise associate the transaction account and the mobile device 210.

In various embodiments, the association of the transaction account and the mobile device may be triggered and/or initiated when a transaction account, a transaction account identifier, and/or another suitable trigger is provided by user 202 to enable a mobile device 210 to be used as a transaction instrument. In this regard, the mobile device may be configured with a communications protocol that allows the mobile device to communicate with point of sale devices in order to initiate transactions (e.g., an NFC communications protocol, a BLE communications protocol, and RF communications protocol, and/or the like).

In various embodiments, verification module 222 may generate and/or otherwise create a comparison protocol for the secret element and the issuer element (Step 110). The comparison protocol may allow mobile device 210 to determine whether the secret element satisfies the issuer element. In this regard, the comparison protocol may be any suitable analysis and/or comparison method (e.g., matching the secret element to the issuer element), algorithm, and/or computer analysis to verify that the secret element sufficiently corresponds to and/or satisfies the issuer element. This comparison protocol may not call for an exact match, but may use a partial match as sufficient satisfaction of the comparison protocol for further evaluation and/or authorization of the transaction. For example, the secret element and the issuer element may be complimentary to one another, but may not be equal to one another.

In various embodiments, verification module 222 and/or secure element 220 may further associate the issuer element with the transaction account (Step 115). The association may be captured in a table, a tag, and/or any other data associated with the transaction account.

In various embodiments, the transaction account associated with mobile device 210 and/or secure element 220 may be enabled for purchases with mobile device 210 (Step 120). Mobile device 210 and/or secure element 220 may also be activated and/or enabled to facilitate payment and/or communicate data with a point of sale device. Mobile device 210 and/or secure element 220 may also communicate with an issuer system 207 to indicate that the transaction account has been associated with mobile device 210 and/or secure element 220 for making payments with the transaction account.

In various embodiments, and in operation when a mobile device is accessed and the identity of the user of the mobile device is verified (e.g., by the user entering a passcode pattern, biometric information, and/or the like) secure element 220 may receive the secret element (Step 125). As discussed herein, the secret element may be stored in mobile device 210 (e.g., in credential database 216). In lieu of simply indicating by the mobile device that a user provided proper credential information (e.g., a bit—a "1" or a "0"), the secure element may receive, from the mobile device, all or at least a portion of the secret element (Step 125). The secret element may compare the secret element to the issuer element based on the comparison protocol. (Step 130). This may enable one or more transaction accounts associated with mobile device 210 and/or secure element 220 to be capable of conducting transactions. In this regard, multiple secret elements may be transmitted from mobile device 210 to secure element 220 (e.g., one for each transaction account associated with mobile device 210 and/or secure element 220) in response to mobile device 210 receiving proper credential information from a user.

In various embodiments and with reference to FIG. 2B, mobile device 210 may be configured to and/or capable of initiating a payment at a point of sale ("POS") terminal 205. POS 205 may be associated with a brick and mortar retailer. Moreover, POS 205 may be configured with a wireless communication protocol that allows POS 205 to communicate with and/or receive transaction account information from mobile device 210. POS 205 may be configured to and/or capable of communicating with issuer system 207. POS 205 may provide transaction account information received from mobile device 210 to issuer system 207 to initiate and/or authorize a transaction. Moreover, mobile device 210 may derive a cryptogram from transaction details. The transaction details may include, for example, a transaction amount, a transaction account identifier, merchant information, and/or the like. The transaction details and/or cryptogram may also include an indication that the identity of the transaction account owner was verified based on the secret element satisfying the issuer element.

In various embodiments, issuer system 207 may be further configured to evaluate fraud risk associated with the transaction details. In this regard and as discussed herein, issuer system 207 may evaluate the results of the comparison between the secret element and the issuer element and/or the results of the comparison protocol (e.g., to confirm that the secret element satisfied the issuer element). Moreover, issuer system 207 may evaluate the transaction data associated with the transaction initiated by mobile device 210 and/or other circumstances surrounding the transaction.

In various embodiments, issuer system 207 may authorize a transaction initiated by mobile device 210. This authorization may be triggered by and/or may be subject to information contained in the cryptogram and/or additional information including, for example, the creditworthiness of the user and the circumstances surrounding the transaction, the merchant initiating the transaction, the goods being purchased in the transaction, the region associated with the transaction, the time associated with the transaction, and/or any other suitable parameter associated with the transaction, the user, the merchant and/or any other party to the transaction.

Phrases and terms similar to "business," "service host" or "merchant" may be used interchangeably with each other and shall mean any person, entity, distributor system, software and/or hardware that is a provider, broker and/or any other entity in the distribution chain of goods or services. In this regard, the "business," "service host" or "merchant" may facilitate a real world or virtual interaction, transaction, exchange of information between a supplier of an item and a user.

Terms and phrases similar to "associate" and/or "associating" may include tagging, flagging, correlating, using a look-up table or any other method or system for indicating or creating a relationship between elements, such as, for example, (I) a transaction account and (ii) an item (e.g., offer, reward, discount) (iii) a digital channel, (iv) a service request, (v) a service host, and/or the like. Moreover, the associating may occur at any point, in response to any suitable action, event, or period of time. The associating may occur at pre-determined intervals, periodic, randomly, once, more than once, or in response to a suitable request or action.

The phrases consumer, customer, user, account holder, account affiliate, cardmember or the like shall include any person, entity, business, government organization, business, software, hardware, machine associated with a transaction account, that buys merchant offerings offered by one or more merchants using the account and/or that is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a biometric, and the like.

The system may include or interface with any of the foregoing accounts, devices, and/or a transponder and reader in BLE communication with the transponder (which may include a fob), or communications between an initiator and a target enabled by short range communications protocols. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader, and/or near field communication (NFC) technologies.

Phrases and terms similar to "transaction" may include any purchase, exchange, lease, rental, deal agreement, authorization, settlement, information exchange, item exchange, a record of charge (or "ROC"), record of transaction ("ROT"), including all related data and metadata, and/or the like. Moreover, the transaction information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. Various databases used herein may include client data; merchant data; financial institution data; and/or like data useful in the operation of the system. As those skilled in the art will appreciate, user computer may include an operating system (e.g., Windows operating system. UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk instilled in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols standards and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML cascading style sheets (CSS), AJAX (Asynchronous Javascript And XML), helper applications, plugins, and the like. A server may include a web service that receives a request from a web server, the request including a URL (http://yahoo.com/stockquotes/ge) and an IP address (123.56.789.224). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995), (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard in specific embodiments. However, the benefits advantages solutions in problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:

obtaining, by a processor of a computing device, credential information of a user of the computing device;

authenticating, by the processor of the computing device, the credential information of the user of the computing device;

releasing, by the processor of the computing device and in response to authenticating the credential information, a first secret element to a secure element processor of the computing device, wherein the first secret element is associated with a first transaction account;

comparing, by the secure element processor of the computing device, the first secret element with an issuer element associated with the first transaction account;

verifying, by the secure element processor of the computing device, that the user is an authorized user of the first transaction account based on the comparison of the first secret element with the issuer element associated with the first transaction account;

initiating, by the processor of the computing device, a payment transaction using first transaction account information with a point-of-sale terminal; and sending, by the processor of the computing device, an indication that the user has been confirmed as an authorized user of the first transaction account to the point-of-sale terminal to advance authorization of the payment transaction initiated by the processor of the computing device.

2. The method of claim 1, wherein the computing device is a mobile device.

3. The method of claim 1, wherein the computing device includes a device credential database that stores the first secret element.

4. The method of claim 1, wherein the first secret element is received, by the processor of the computing device, from an issuer system.

5. The method of claim 1, further comprising generating, by the processor of the computing device, a cryptogram containing the indication that the user has been confirmed as an authorized user of the first transaction account, wherein the cryptogram is sent to the point-of-sale terminal.

6. The method of claim 1, wherein the first secret element is stored on the computing device outside the secure element processor.

7. The method of claim 1, wherein the issuer element is stored in an issuer credential database on the computing device that is in communication with the secure element processor, and wherein an association between the issuer element and the first transaction account is stored as a table in the issuer credential database.

8. The method of claim 1, wherein the first secret element is stored on the computing device during an initial setup of the first transaction account.

9. The method of claim 1, wherein the comparison of the first secret element with the issuer element verifies that the first secret element partially matches with the issuer element.

10. A device comprising:

a processor;

a secure element processor;

a first tangible, non-transitory memory configured to communicate with the processor, the first tangible, non-transitory memory having instructions stored thereon, wherein the instructions, when executed by the processor, cause the processor to:

obtain credential information of a user of the device;

authenticate the credential information of the user of the device;

release a first secret element to the secure element processor of the device, wherein the first secret element is associated with a first transaction account;

receive confirmation, from the secure element processor of the device, that the user is an authorized user of the first transaction account after the secure element processor compares the first secret element with an issuer element associated with the first transaction account;

initiate a payment transaction using first transaction account information with a point-of-sale terminal;

send an indication that the user has been confirmed as an authorized user of the first transaction account to the point-of-sale terminal to advance authorization of the payment transaction initiated by the device; and a second tangible, non-transitory memory configured to communicate with the secure element processor, the second tangible, non-transitory memory having instructions stored thereon, wherein the instructions, when executed by the secure element processor, cause the secure element processor to:

compare the first secret element with the issuer element associated with the first transaction account; and send, to the processor, the confirmation that the user is the authorized user of the first transaction account.

11. The device of claim 10, wherein the instructions further cause the processor to release a second secret element to the secure element processor, wherein the second secret element is associated with a second transaction account.

12. The device of claim 10, wherein the issuer element is stored in an issuer credential database that is in communication with the secure element processor, and wherein an association between the issuer element and the first transaction account is stored in the issuer credential database.

13. The device of claim 10, wherein the first secret element is stored on the device during an initial setup of the first transaction account.

14. The device of claim 10, wherein the issuer element comprises a pin code.

15. The device of claim 10, wherein the comparison of the first secret element with the issuer element verifies that the first secret element partially matches with the issuer.

16. Non-transitory computer-readable media comprising a first non-transitory computer-readable medium and a second non-transitory computer-readable medium, wherein the first non-transitory computer-readable medium has instructions stored thereon that, in response to execution by a processor of a computing device, causes the computing device to:

obtain credential information of a user of the computing device;

authenticate the credential information of the user of the computing device;

release a first secret element to a secure element processor of the computing device, wherein the first secret element is associated with a first transaction account;

receive confirmation, from the secure element processor of the computing device, that the user is an authorized user of the first transaction account after the secure element processor compares the first secret element with an issuer element associated with the first transaction account;
initiate a payment transaction using first transaction account information with a point-of-sale terminal; and
send an indication that the user has been confirmed as an authorized user of the first transaction account to the point-of-sale terminal to advance authorization of the payment transaction initiated by the device; and
wherein the second non-transitory computer-readable medium further includes instructions stored thereon that, in response to execution by the secure element processor of the computing device, causes the computing device to:
compare the first secret element with the issuer element associated with the first transaction account; and
send, to the processor, the confirmation that the user is the authorized user of the first transaction account.

17. The non-transitory computer-readable medium of claim 16, wherein the instructions further cause the processor to release a second secret element to the secure element processor, wherein the second secret element is associated with a second transaction account.

18. The non-transitory computer-readable medium of claim 16, wherein the first secret element is stored on the device during an initial setup of the first transaction account.

19. The non-transitory computer-readable medium of claim 16, wherein the issuer element comprises a pin code.

20. The non-transitory computer-readable medium of claim 16, wherein the comparison of the first secret element with the issuer element verifies that the first secret element partially matches with the issuer.

* * * * *